(12) United States Patent
Sesti et al.

US 11,012,684 B2

(10) Patent No.: US 11,012,684 B2
(45) Date of Patent: May 18, 2021

(54) VEHICULAR CAMERA TESTING USING A SLANTED OR STAGGERED TARGET

(71) Applicant: Magna Electronics Inc., Auburn Hills, MI (US)

(72) Inventors: Matthew C. Sesti, Williamston, MI (US); Donald W. Mersino, Montrose, MI (US); Robert A. Devota, Durand, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 16/718,823

(22) Filed: Dec. 18, 2019

(65) Prior Publication Data

US 2020/0204791 A1 Jun. 25, 2020

Related U.S. Application Data

(60) Provisional application No. 62/878,945, filed on Jul. 26, 2019, provisional application No. 62/781,791, filed on Dec. 19, 2018.

(51) Int. Cl.
| | |
|---|---|
| *H04N 17/00* | (2006.01) |
| *H04N 5/225* | (2006.01) |
| *B60R 11/04* | (2006.01) |
| *H04N 5/232* | (2006.01) |
| *B60R 11/00* | (2006.01) |

(52) U.S. Cl.
CPC ........... *H04N 17/002* (2013.01); *B60R 11/04* (2013.01); *H04N 5/2254* (2013.01); *H04N 5/23229* (2013.01); *B60R 2011/0026* (2013.01)

(58) Field of Classification Search
CPC ............... H04N 17/002; H04N 5/2254; H04N 5/23229; B60R 11/04; B60R 2011/0026
USPC ...................................................... 348/148
See application file for complete search history.

(56) References Cited

U.S. PATENT DOCUMENTS

| | | | |
|---|---|---|---|
| 5,550,677 A | 8/1996 | Schofield et al. | |
| 5,670,935 A | 9/1997 | Schofield et al. | |
| 5,949,331 A | 9/1999 | Schofield et al. | |
| 7,038,577 B2 | 5/2006 | Pawlicki et al. | |
| 7,720,580 B2 | 5/2010 | Higgins-Luthman | |
| 7,855,755 B2 | 12/2010 | Weller et al. | |
| 2002/0050988 A1* | 5/2002 | Petrov | G06K 9/20 345/418 |
| 2005/0089208 A1 | 4/2005 | Dong et al. | |

(Continued)

*Primary Examiner* — Talha M Nawaz
*Assistant Examiner* — Matthew David Kim
(74) *Attorney, Agent, or Firm* — Honigman LLP

(57) ABSTRACT

A method of testing a vehicular camera for a vehicular vision system includes providing a vehicular camera suitable for use on a vehicle, with the vehicular camera having a field of view. A collimator is provided that includes an optic and a target. The collimator is positioned in the field of view of the vehicular camera such that the camera images light that reflects off the target and passes through the optic. The target is angled or stepped relative to an image plane of the vehicular camera. Image data is captured with the vehicular camera, with the captured image data being representative of the angled or stepped target. The captured image data is processed, via an image processor, and a defocus of the vehicular camera is estimated based on processing by the processor of the captured image data of the angled or stepped target.

9 Claims, 10 Drawing Sheets

(56) References Cited

U.S. PATENT DOCUMENTS

| | | |
|---|---|---|
| 2006/0038910 A1* | 2/2006 | Knoedgen .......... G01M 11/0221 |
| | | 348/345 |
| 2006/0038976 A1* | 2/2006 | Knoedgen ............ H04N 17/002 |
| | | 356/10 |
| 2007/0211240 A1 | 9/2007 | Matsumoto et al. |
| 2014/0152845 A1* | 6/2014 | Seger ..................... G02B 27/62 |
| | | 348/188 |
| 2015/0138372 A1* | 5/2015 | Apel ..................... G02B 27/36 |
| | | 348/188 |
| 2015/0277135 A1* | 10/2015 | Johnson ................. G02B 27/30 |
| | | 359/641 |
| 2017/0006282 A1 | 1/2017 | Sigle |
| 2017/0132774 A1* | 5/2017 | Ruprecht ........... H04N 5/23299 |
| 2017/0234923 A1 | 8/2017 | Douglas et al. |
| 2017/0287166 A1* | 10/2017 | Claveau ............... H04N 17/002 |
| 2018/0113321 A1* | 4/2018 | Heshmat Dehkordi .................... |
| | | G02B 27/58 |
| 2018/0302615 A1 | 10/2018 | Lehmann et al. |
| 2018/0373944 A1 | 12/2018 | Sesti et al. |

\* cited by examiner

VEHICULAR CAMERA TESTING USING A SLANTED OR STAGGERED TARGET

CROSS REFERENCE TO RELATED APPLICATIONS

The present application claims priority of U.S. provisional application, Ser. No. 62/878,945, filed Jul. 26, 2019, and U.S. provisional application Ser. No. 62/781,791, filed Dec. 19, 2018, which are hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a testing system for a camera for a driver assistance system or vision system or imaging system for a vehicle. The testing system or method measures or estimates the defocus of the camera. The system includes a collimator with an internal optic and target. The target may be angled relative to an image plane of the camera or include a stepped surface within the view of the optic and camera. The defocus of the camera may be measured based on image data captured of the angled or stepped target.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
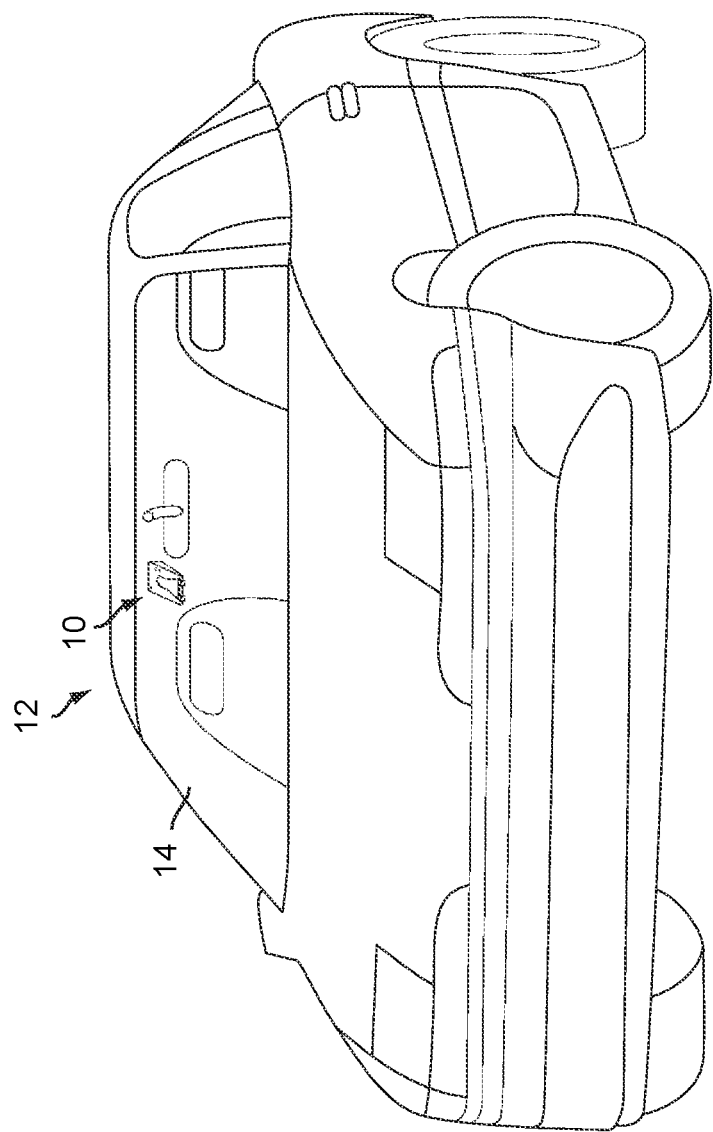
FIG. 1 is a perspective view of a vehicle with a vision system that incorporates at least a forward camera module.

Referring now to the drawings and the illustrative embodiments depicted therein, a vision system 10 for a vehicle 12 includes at least one exterior viewing imaging sensor or camera, such as a forward viewing imaging sensor or camera, which may be disposed at and behind the windshield 14 of the vehicle and viewing forward through the windshield so as to capture image data representative of the scene occurring forward of the vehicle (FIG. 1). Optionally, the system may include multiple exterior viewing imaging sensors or cameras, such as a forward viewing camera at the front of the vehicle, and a sideward/rearward viewing camera at respective sides of the vehicle, and a rearward viewing camera at the rear of the vehicle, which capture images exterior of the vehicle. The camera or cameras each include a lens for focusing images at or onto an imaging array or imaging plane or imager of the camera. Optionally, the forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 10 includes a control or electronic control unit (ECU) or processor that is operable to process image data captured by the camera or cameras and may detect objects or the like and/or provide displayed images at a display device for viewing by the driver of the vehicle. The data transfer or signal communication from the camera to the ECU may comprise any suitable data or communication link, such as a vehicle network bus or the like of the equipped vehicle.

Figure 2:
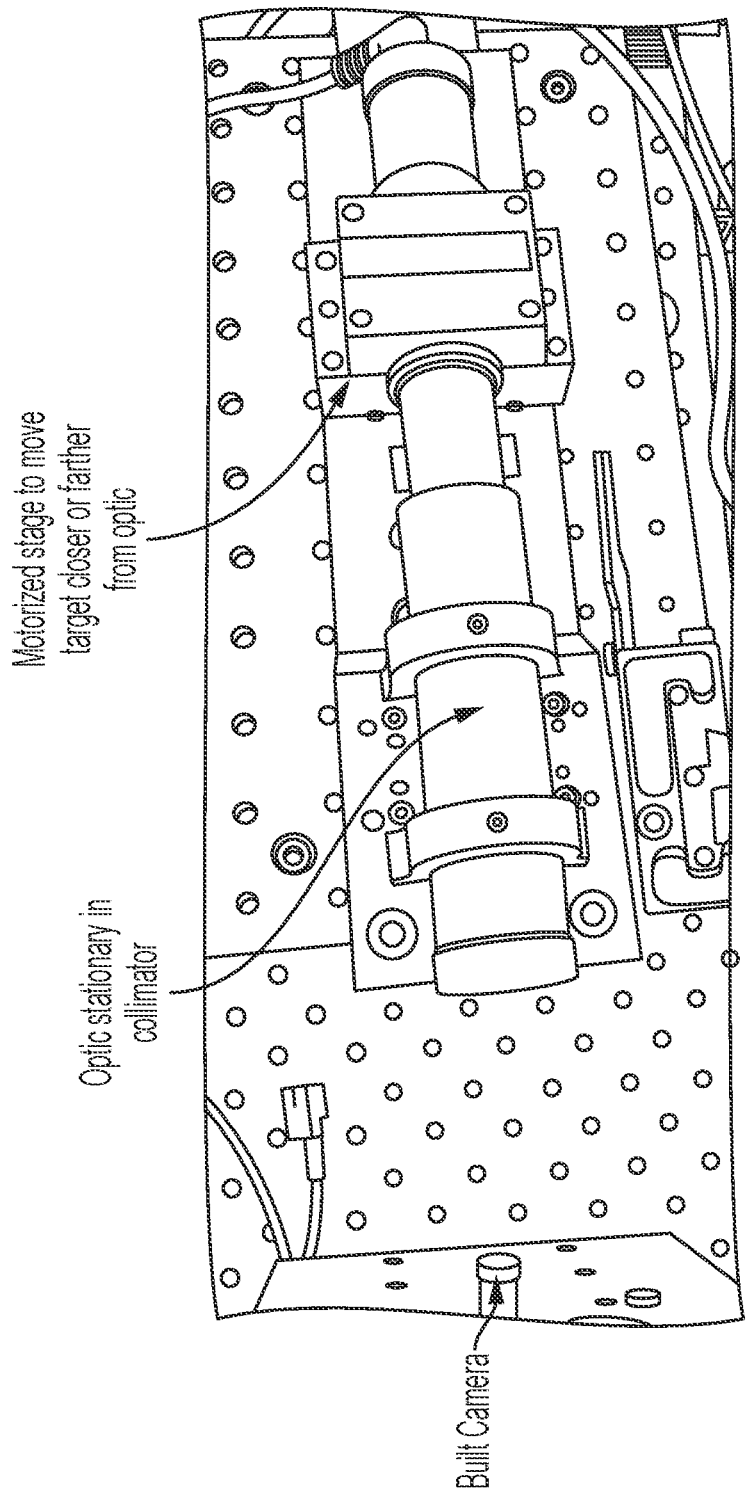
FIG. 2 is a perspective view of a motorized test system.
Figure 3:
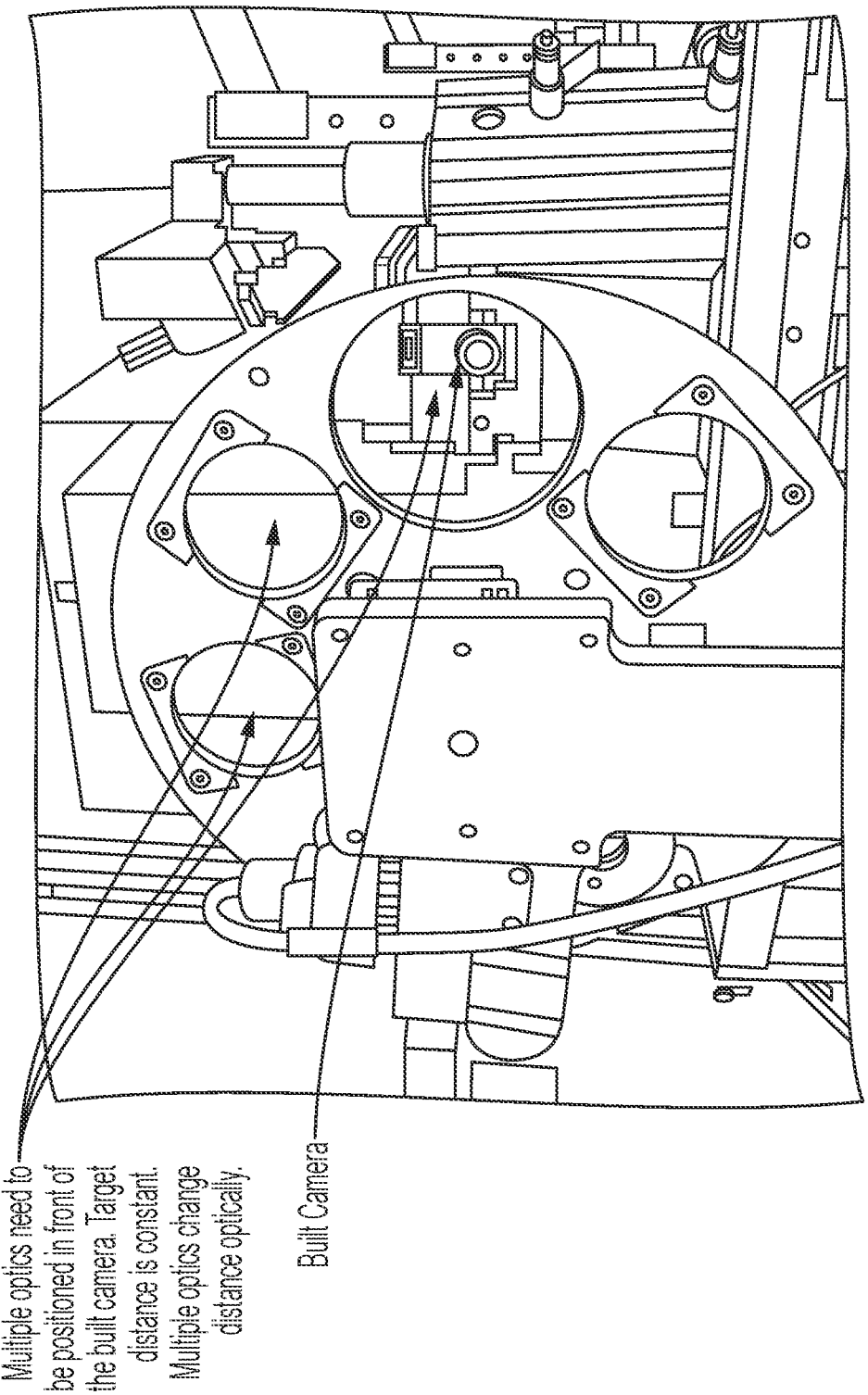
FIG. 3 is a perspective view of a test system with multiple optics.
Figure 4:
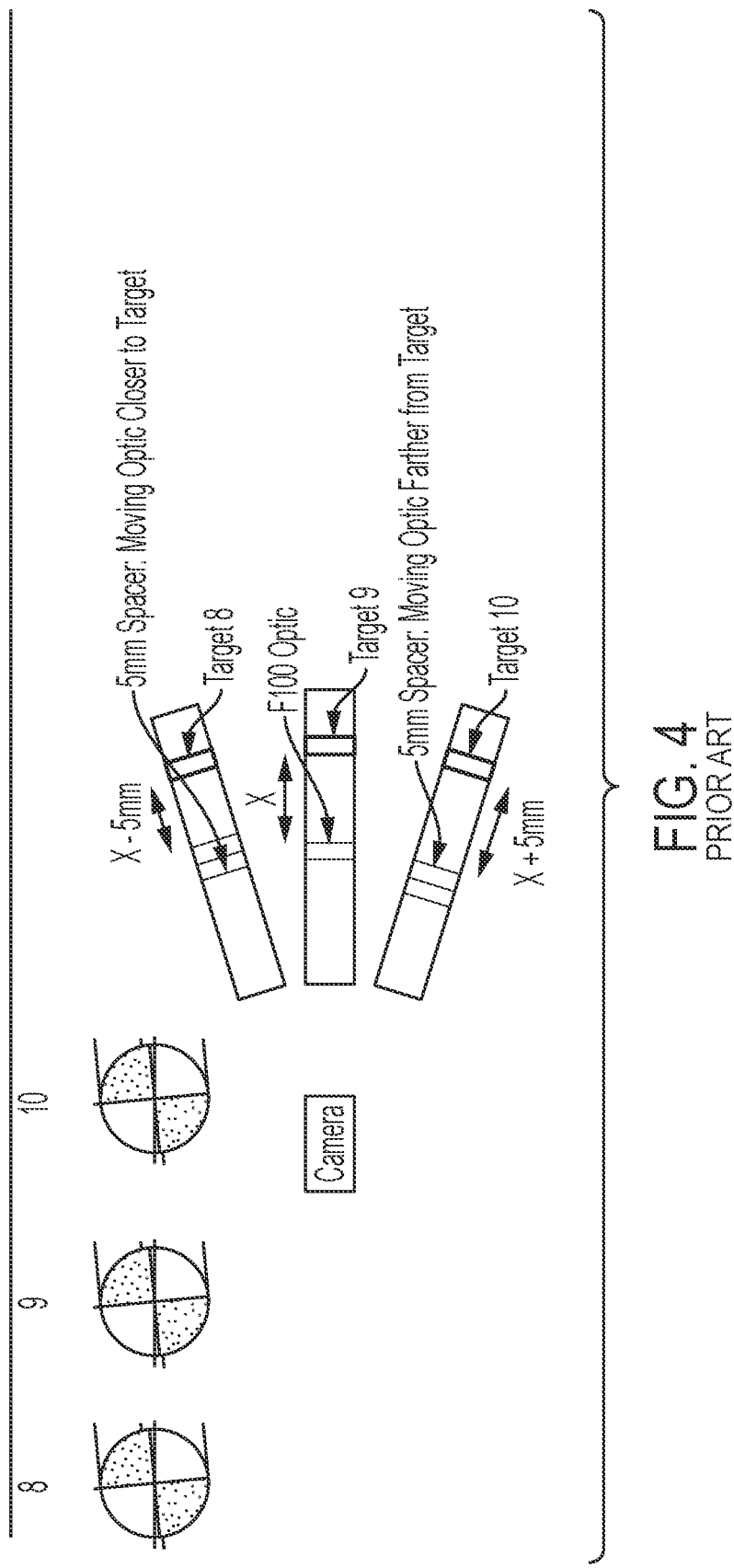
FIG. 4 is a block diagram of a test system with multiple collimators.

The system or method of the present invention estimates or measures the defocus of a vehicular camera. Typically, the ability to determine a position of a lens (i.e., an optic) in relation to an imager is accomplished by one of three methods. First, as illustrated in FIG. 2, the defocus may be estimated by utilizing a motorized stage to move a target to different distances in relation to the optic. This method increases cycle time, requires a complex motorized system, incurs significant equipment costs, and requires moving parts to estimate defocus. Second, as illustrated in FIG. 3, the defocus may be estimated by using multiple collimators with targets located in different positions in relation to the optic. This method also increases cycle time due to measuring with multiple optics, requires a complex motorized system, incurs significant equipment costs, and requires moving parts to estimate defocus. Third, as illustrated in FIG. 4, the defocus may be estimated by using different optics to simulate different distances. This method increases costs due to the multiple collimators, increases the complexity of the collimators, and potentially decreases accuracy (due to measuring different collimators in different locations). These processes are commonly referred to as measuring or estimating the defocus of a camera. That is, these processes determine how far off peak the finished camera is.

The system or method of the present invention (FIGS. 5 and 6) uses a single collimator and positions an internal target at different distances relative to the optic. Thus, only a single collimator without moving parts is used. This allows for reduced capital expenditures, reduced collimator complexity, and increases accuracy due to measuring with only a single collimator at a single location. Additionally, the present invention provides the ability to measure defocus in each collimator location and does not require moving parts to estimate or measure defocus. Image data captured by the camera with the target or targets present in the field of view of the camera is processed (via an image processor) to determine or estimate the degree of focus or defocus of the camera at the target.

Figure 5:
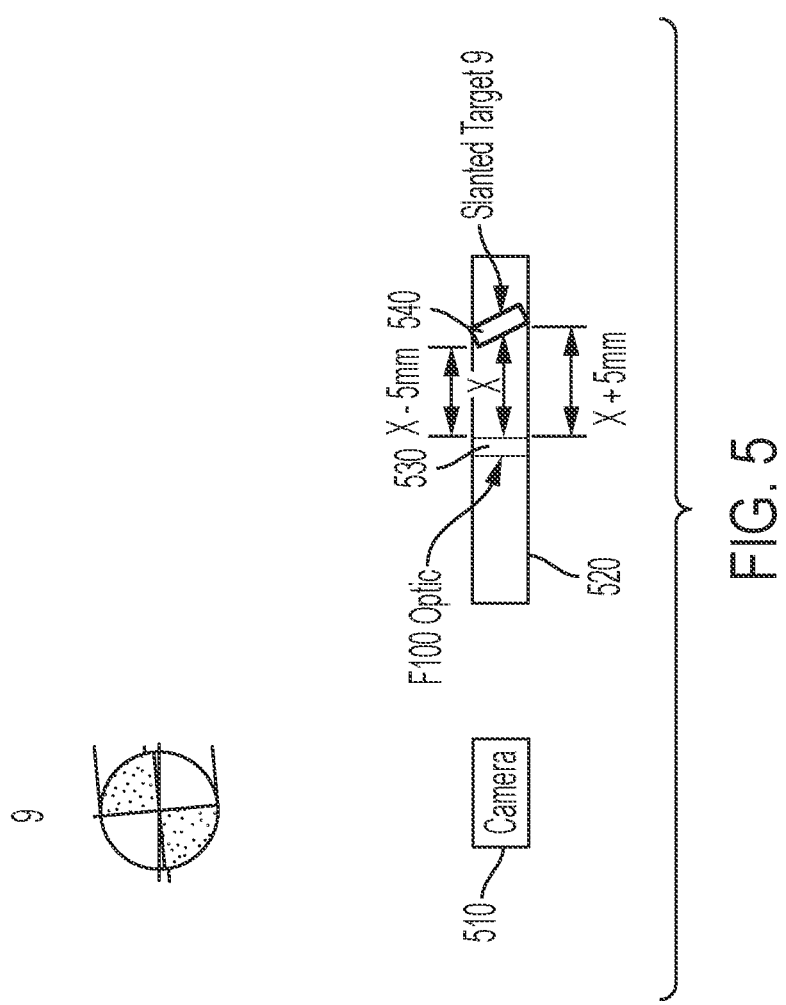
FIG. 5 is a block diagram of a test system with a slanted target in accordance with the present invention.

Referring now to FIG. 5, a camera 510 has a field of view that includes a collimator 520. The collimator 520 includes a lens or optic 530 and target 540. The target 540 is angled relative to an image plane of the camera 510. For example, the target 540 may be angled at 45 degrees relative to the image plane of the camera 510. The angling of the target 540 results in one edge of the target 540 being closer to the optic 530 (and camera 510) than the opposite edge. For example, if the distance between the optic 530 and the center of the target 540 is x, one edge may be x−5 mm while the opposite edge is x+5 mm. Thus, the camera 510 may image the target 540 at a plurality of distances without moving the camera 510, the collimator 520, the optic 530, or the target 540.

Figure 6:
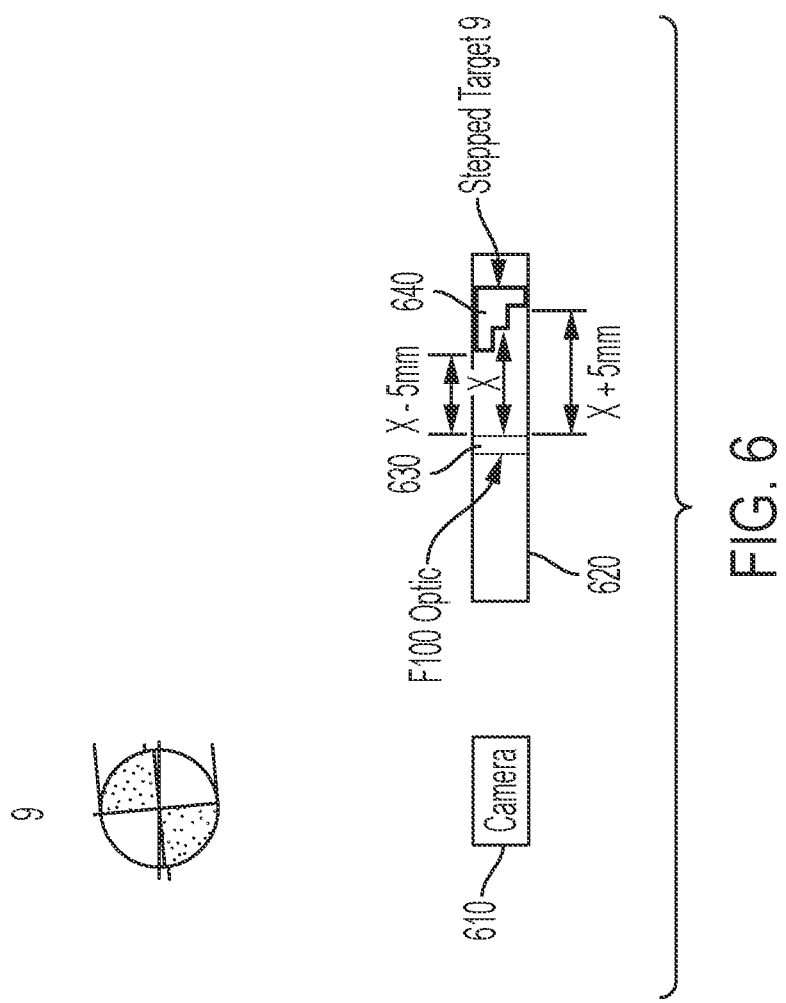
FIG. 6 is a block diagram of a test system with a staggered target in accordance with the present invention.

In another implementation, a camera 610 has a field of view that includes a collimator 620 (FIG. 6). The collimator 620 includes a lens or optic 630 and target 640. The target 640 includes a stepped surface that is within the field of view of the camera 610. The target 640 may include a plurality of steps, each step a different distance from the optic 630 and camera 610. For example, the target 640 may include 3 steps. In that example, if the distance between the optic 630 and the center step is x, one step may be x−5 mm while the third step is x+5 mm. The target 640 may include any number of steps. The steps may maintain a regular distance from one step to the next or an irregular distance. Thus, the camera 610 may image the target 640 at a plurality of distances without moving the camera 610, the collimator 620, the optic 630, or the target 640.

Figure 7B:
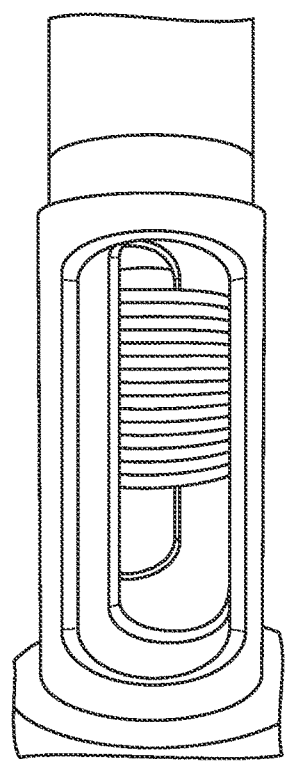
FIGS. 7A and 7B are perspective views of a collimator with multiple targets in accordance with the present invention.
Figure 7A:
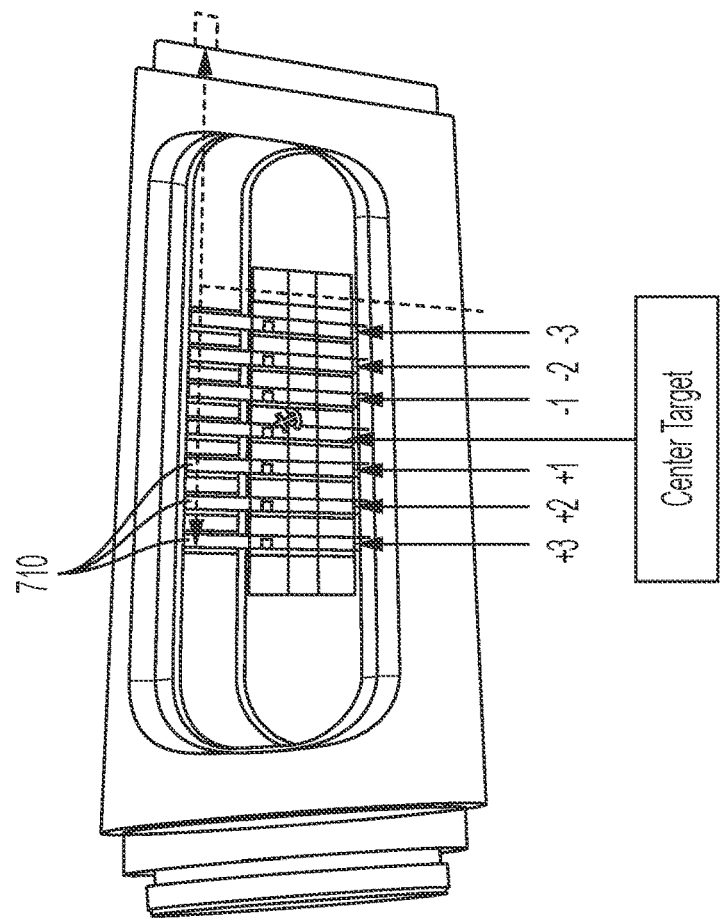

In some examples, the system includes multiple targets 710 to increase the measurement window. That is, additional targets may be added before and/or after a center target (FIGS. 7A and 7B). For example, the system may include a total of seven targets 710, and the center target may have one, two, or three targets in front of it (i.e., +1, +2, and +3) and one, two, or three targets behind it (i.e., −1, −2, and −3).

Figure 8A:
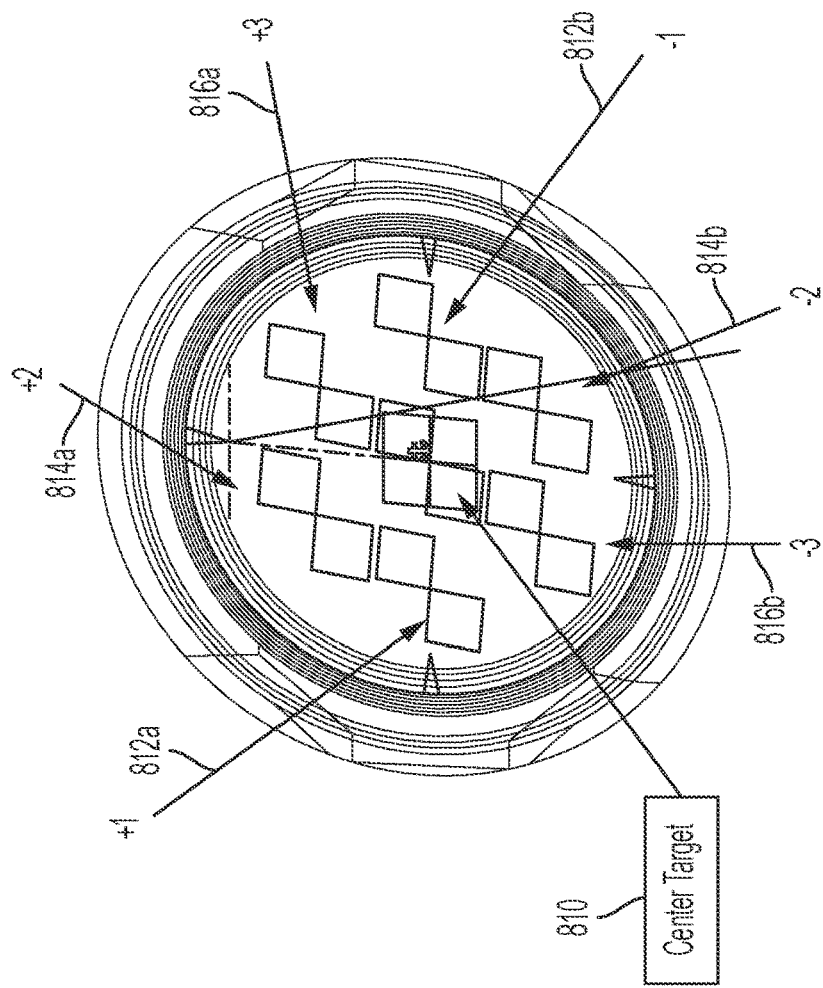
FIGS. 8A and 8B are perspective views of an etched glass target in accordance with the present invention.
Figure 8B:
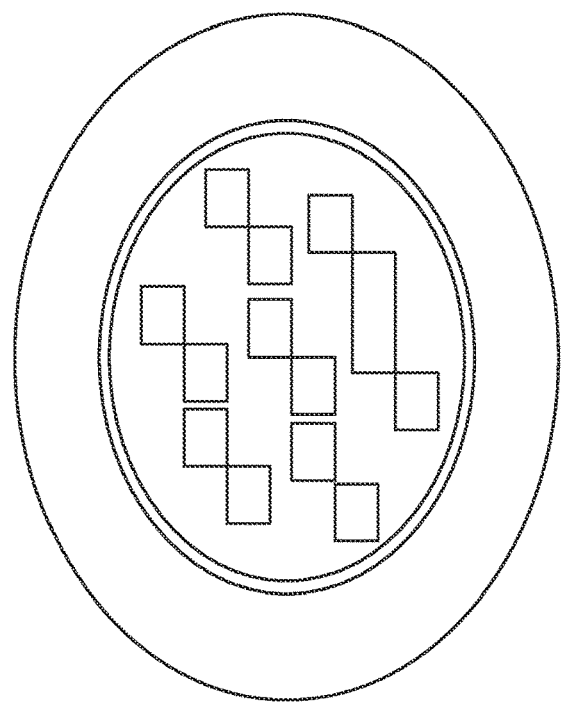

Optionally, and with reference to FIG. 8A, the system may include glass targets with patterns laser etched onto the glass to improve black-to-white transition, with each stacked as illustrated in FIGS. 7A and 7B. The glass targets may have any diameter. For example, the targets may have a one inch diameter. Each target may have a different pattern thus giving the collimator multiple patterns at different distances. In some examples, four different patterns are used: a center target pattern and three other target patterns equally spaced around the center target pattern (FIG. 8A). For example, the center target 810 may have a unique pattern, the +1 and −1 targets 812a, 812b may share a pattern, the +2 and −2 targets 814a, 814b may share a pattern, and the +3 and −3 targets 816a, 816b may share a pattern for a total of four separate patterns. The patterns may include interlocking squares or rectangles that create high contrast (FIG. 8B).

Figure 9:
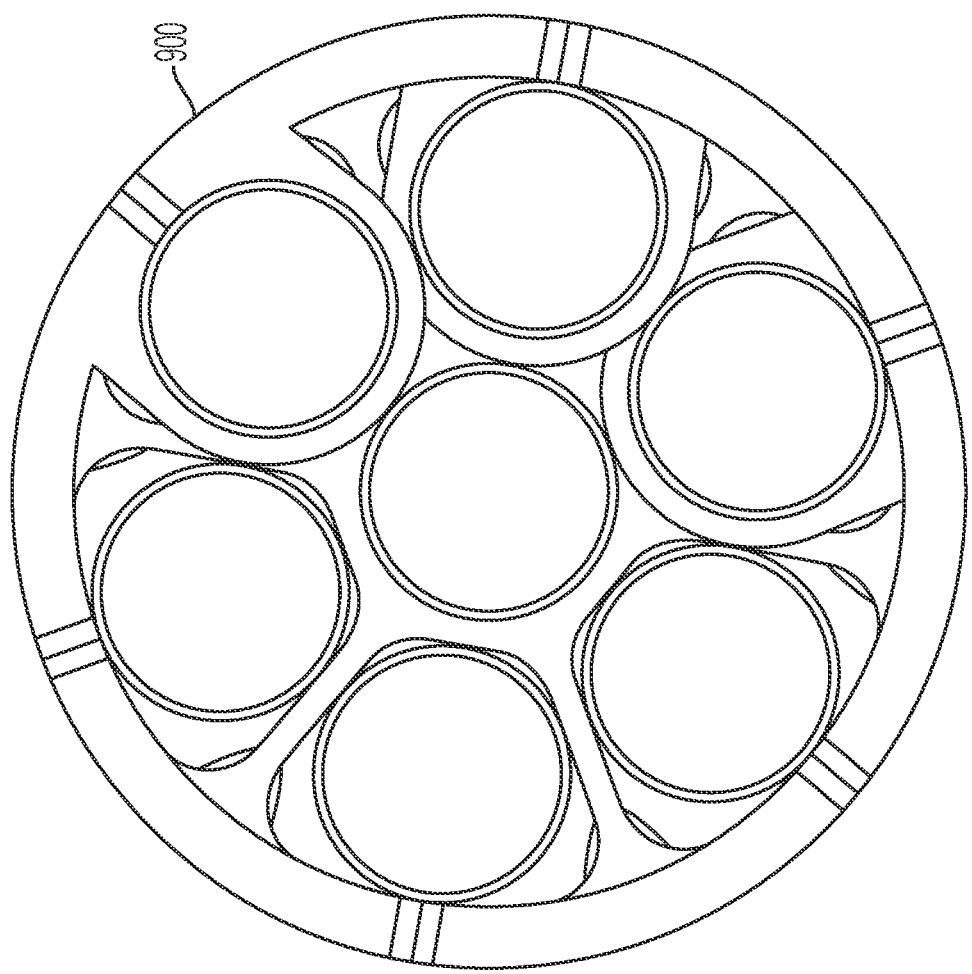
FIG. 9 is a plan view of a of a staircase step collimator in accordance with the present invention.
Figure 10:
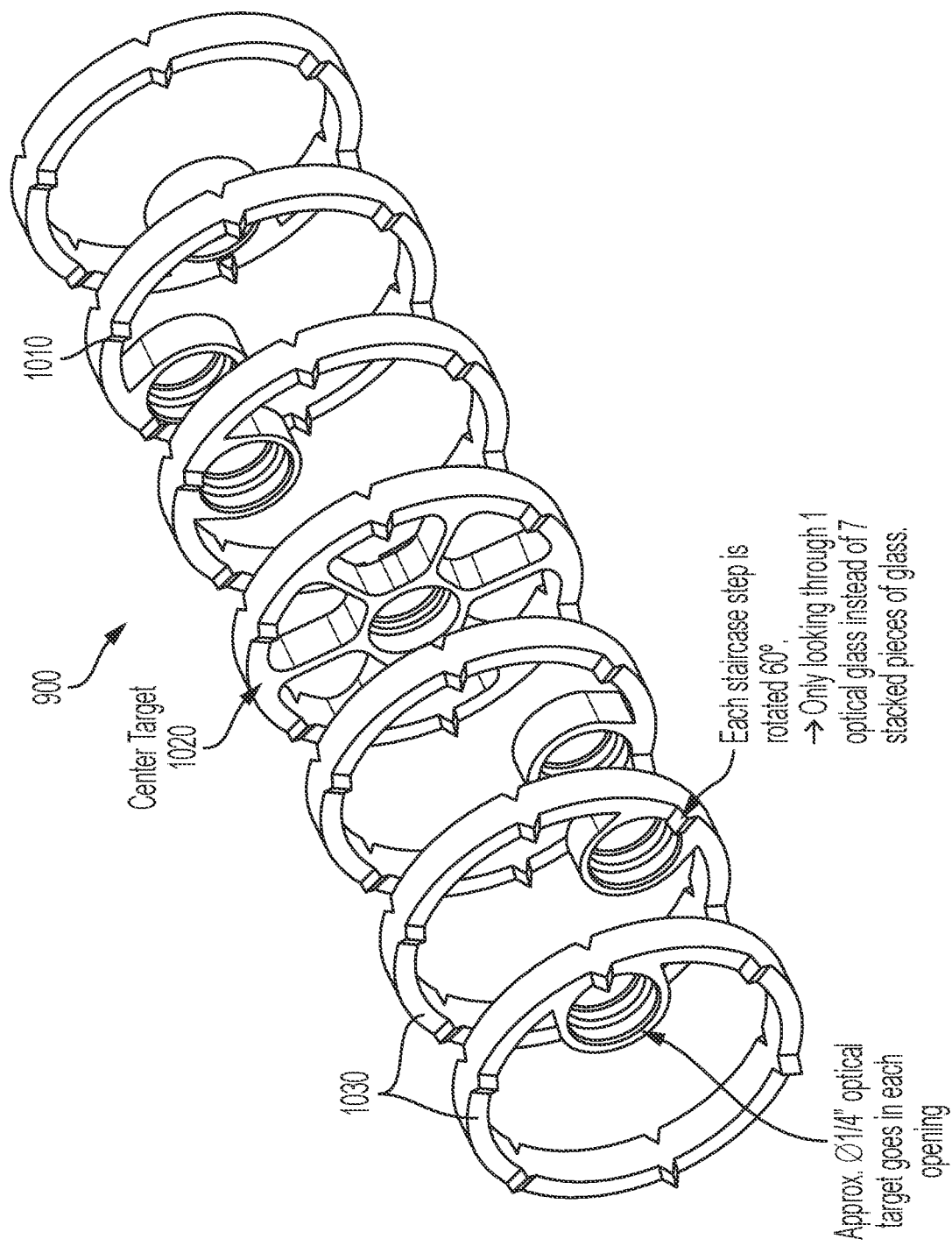
FIG. 10 is an exploded view of the staircase step collimator of FIG. 9.

Referring now to FIG. 9, in another example, the target may include a staircase collimator 900 with multiple (e.g., seven) targets. That is, the target may include multiple staircase "steps" 900, each with a single target disposed within an opening 1010 of the step (FIG. 10). The target disposed within each opening of each step may include optical glass (e.g., a quarter inch in diameter optical target). One step may be a center target step 1020 while the remaining steps are non-center steps 1030. The center step 1020 may include the opening 1010 in the center of the step. Each non-center step 1030 may include the opening 1010 for the target around the perimeter of the step, and each step may be rotated with respect to the other non-center steps so that the camera views each target through a single piece of glass (as opposed to multiple pieces of glass for multiple targets). For example, there may be seven steps 900 (and therefore seven targets). For example, six of the non-center steps 1030 may be each offset 60 degrees from the previous to create a ring of targets and the seventh may be disposed in the center of the step (i.e., in the center of the ring of six targets).

Thus, the system of the present invention includes a single collimator without moving parts and with one or more targets that measures the defocus of a camera. The collimator may include a light emitting diode (LED) light source. High precision tooling (e.g., Fullcut Mill (FCM) 3) may be used to improve stability. Image data captured by the camera with the target or targets present in the field of view of the camera is processed (via an image processor) to determine the degree of focus or defocus of the camera at the target.

The system includes an image processor operable to process image data captured by the camera or cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. The system may utilize aspects of the systems described in U.S. Publication No. US-2018-0373944, which is hereby incorporated herein by reference in its entirety.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140;

US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method of testing a vehicular camera for a vehicular vision system, the method comprising:
    providing a vehicular camera configured for use on a vehicle, wherein the vehicular camera has a field of view;
    providing a collimator assembly, the collimator assembly comprising an optic fixedly disposed within the collimator assembly and a target fixedly disposed within the collimator assembly;
    positioning the collimator assembly in the field of view of the vehicular camera such that the vehicular camera images light that has reflected off the target and that has passed through the optic and such that a longitudinal axis of the collimator assembly is aligned with a principal axis of the field of view of the vehicular camera, wherein, with the collimator assembly positioned in the field of view of the vehicular camera, the optic is perpendicular to the principal axis of the field of view of the vehicular camera and the target is angled relative to the optic and the image plane of the vehicular camera;
    capturing image data with the vehicular camera, wherein the captured image data is representative of the angled target;
    processing, via an image processor, the image data captured by the vehicular camera; and
    responsive to processing by the image processor of the image data captured by the vehicular camera, estimating a defocus of the vehicular camera.

2. The method of claim 1, wherein the angled target is angled at 45 degrees relative to the image plane of the vehicular camera.

3. The method of claim 1, wherein estimating the defocus of the vehicular camera comprises estimating the defocus of the vehicular camera at a plurality of positions on the angled target, each position at a different distance from the optic.

4. The method of claim 3, wherein the defocus of the vehicular camera is estimated from three positions.

5. The method of claim 1, wherein at least some of the light that has reflected off the target is emitted by a light emitting diode disposed at the collimator assembly.

6. A method of testing a vehicular camera for a vehicular vision system, the method comprising:
    providing a vehicular camera suitable for use on a vehicle, wherein the vehicular camera has a field of view;
    providing a collimator comprising an optic fixedly disposed within the collimator and a target fixedly disposed within the collimator;
    positioning the collimator in the field of view of the vehicular camera such that the vehicular camera images light that reflects off the target and passes through the optic and such that a longitudinal axis of the collimator is aligned with a principal axis of the field of view of the vehicular camera, wherein the optic is perpendicular to the principal axis of the field of view of the vehicular camera and the target is angled at 45 degrees relative to the optic and the image plane of the vehicular camera;
    capturing image data with the vehicular camera, wherein the captured image data is representative of the angled target;
    processing, via an image processor, image data captured by the vehicular camera; and
    responsive to processing by the image processor of image data captured by the vehicular camera, estimating a defocus of the vehicular camera at a plurality of positions on the angled target, each position at a different distance from the optic.

7. The method of claim 6, wherein the plurality of positions comprises three positions.

8. The method of claim 7, wherein the three positions comprises a first position, a second position, and a third position, and wherein the first position is at least five millimeters closer to the camera than the second position and wherein the second position is at least five millimeters closer to the camera than the third position.

9. The method of claim 6, wherein at least some of the light that has reflected off the target is emitted by a light emitting diode disposed at the collimator.

* * * * *